June 6, 1967 H. S. FEDER 3,324,246

CROSSTALK REDUCTION IN A TIME DIVISION MULTIPLEX SWITCHING SYSTEM

Filed July 16, 1963

INVENTOR
H.S. FEDER
BY
R.C. Winter
ATTORNEY 3,324,246

CROSSTALK REDUCTION IN A TIME DIVISION MULTIPLEX SWITCHING SYSTEM

Herbert S. Feder, Matawan, N.J., assignor to Bell Telephone Laboratories, Incorporated, New York, N.Y., a corporation of New York Filed July 16, 1963, Ser. No. 295,379
6 Claims. (Cl. 179—15)

Figure 1:
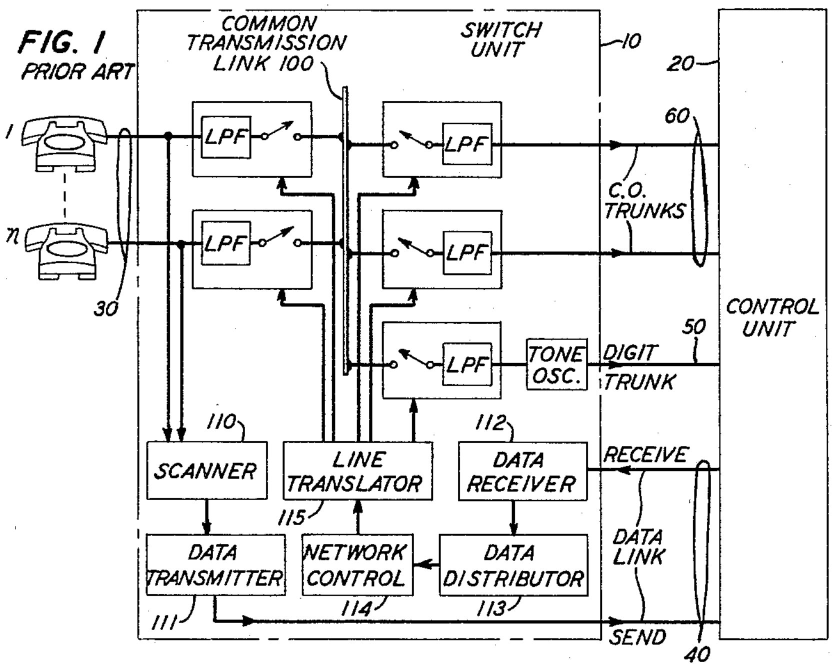
FIG. 1 PRIOR ART

This invention relates to time division multiplex communication systems and, more particularly, to the suppression of crosstalk in such systems.

A practice frequently employed in present day communication systems in the transfer of information from one locality to another is time-sharing, or time division multiplexing, which permits the simultaneous exchange of information between each of a plurality of active pairs of terminals over a common communication link. This practice requires that in successive short time intervals each pair of terminals in communication be assigned a frequently recurring discrete time slot during which information may be sampled, transmitted and received. In the interval between appearances of the time slot assigned to a particular pair of terminals, the common communication link is available to other active pairs of terminals. By sampling at a sufficiently rapid rate, proper filtering and transmission, and relatively lossless transfer of the sampled information to and from the common communication link, an accurate reproduction of the information transmitted from one terminal of the pair may be formed at the other terminal of the pair.

Such a system may be utilized, for example, in various systems wherein a plurality of communication devices may be interconnected via a common communication link in order to conserve expensive transmission facilities. One such system, disclosed in R. C. Gebhardt et al. application Ser. No. 195,199, filed May 16, 1962, now Patent 3,225,144, issued Dec. 21, 1965, involves a private branch exchange type operation in a telephone system. In this instance, a concentration of telephone lines may be interconnected via a common transmission link at a switch unit located in the immediate vicinity. The information for such interconnections is provided by memory and control facilities also contained in the remote switch unit, which facilities in turn are controlled by a common control unit providing control information to a number of such switch units.

Inherently, this type of PBX interconnects active pairs of telephone lines in sequence, each for a distinct time interval or time slot during a repetitive cycle of time slots. The sequential nature of this manner of line interconnection results in the presence of samples of conversations in adjacent time slots in repetitive cycles, and such a circumstance invariably leads to the presence of adjacent channel crosstalk, a channel being the term applied to the transmission path utilized by a pair of active lines interconnected in a predetermined time slot.

The common contributors to such adjacent channel crosstalk are modulations within the listening time slot of the impedance of the gates connecting the active pair of lines to the common communication link and also residual voltages or currents that remain on the common communication link intermediate adjacent time slots due either to inadequate clamping or to insufficient clamping time. Efforts have been made to reduce such adjacent channel crosstalk by the use, for example, of additional common link clamp circuits or by increasing the guard interval between adjacent time slots during which residual signal is removed. Such efforts, however, have not proven entirely satisfactory in current system operation.

It is, therefore, a general object of this invention to suppress crosstalk encountered in adjacent channels of a time division switching system.

It is another object of this invention to realize such crosstalk suppression in a manner which is both reliable and economical.

These and other objects of this invention are attained in accordance with one specific illustrative embodiment wherein a time division switching system of the type described in the aforementioned application of R. C. Gebhardt et al. includes a common control unit and one or more remote switch units. All information pertaining to the establishment of a connection of two lines through the switch unit is transmitted to and processed by the common control unit, after which the control unit directs the appropriate switch unit to store the designations of each of the active lines in a discrete area of a memory located in the switch unit, which area is then addressed during a predetermined time slot of a recurring cycle of time slots.

Upon addressing the discrete storage area of the memory, the information contained therein is retrieved, translated and directed to the appropriate line gates so as to activate them and achieve an interconnection of the desired pair of lines via the common transmission link during the designated time slot in each successive cycle.

The line information stored in the memory at the switch unit is addressed in a regular sequence during each cycle of operation. Thus the active pairs of lines are interconnected in sequence during each cycle.

In accordance with the illustrative embodiment of my invention, information is stored in the memory in two adjacent groups of discrete storage areas, the first group having at least one more storage area than the second group. The address circuitry is arranged such that discrete areas of the first and second groups in the memory are addressed alternately. The total number of storage areas in the first and second groups is equal to the number of time slots available in a cycle of operation. Thus each storage area is addressed during each cycle and the information stored therein is employed to effect an interconnection of a pair of lines during the corresponding time slot in each cycle of operation.

The discrete storage areas in each group are addressed in sequence, and the interleaving of the storage areas addressed in each cycle of operation results in a precession of the interconnections involving the second group of discrete storage areas with respect to the interconnections involving the first group of storage areas. Such precession guarantees that any two channels will not be adjacent one another in successive cycles of operation, thereby effectively eliminating adjacent channel crosstalk by reducing it to nonintelligible noise at a relatively low level.

One simple expedient for providing the requisite address circuitry is the provision of an additional binary counter, which alternates with the available binary counter and counts solely within the range required by the second group of discrete storage areas in the memory. The available binary counter, of course, is then restricted in its count to the range including the first group of discrete storage areas in the memory.

It is a feature of this invention that the time slots in each cycle be divided in to two unequal groups, with the channel assignments for the corresponding groups of time slots being interleaved in each cycle.

It is another feature of this invention that the channel completion information be stored in a memory in two unequal groups of discrete storage areas, that the storage areas in each group be addressed in sequence, and that the groups be addressed alternately.

More particularly, it is a feature of this invention that a binary counter correspond to each group of storage areas and count in the range designating only the corresponding group, and that the counters alternately activate the store address circuitry.

Figure 2:
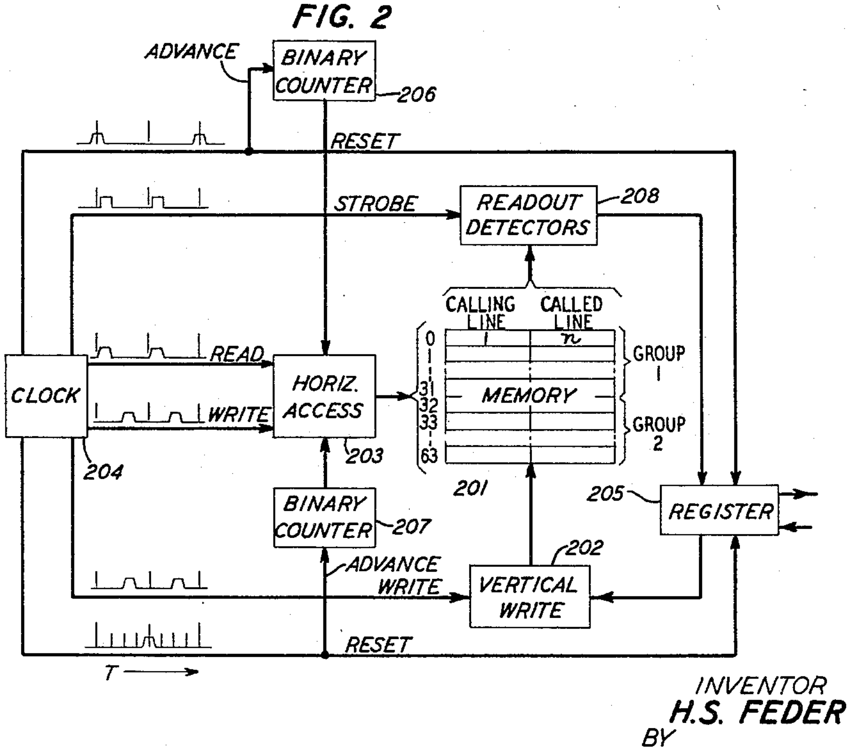

A complete understanding of these and other features of the invention may be gained from consideration of the following description, together with the accompanying drawing, in which:

FIG. 1 is a schematic representation in block diagram form of a time division switching system in which the arrangement in accordance with this invention may be employed; and FIG. 2 is a schematic representation of a specific arrangement of the memory access circuitry in accordance with this invention which may be employed in the system of FIG. 1.

Turning now to the drawing, the principal characteristics of one switch unit for the electronic PBX system described in detail in the aforementioned Gebhardt et al. application are illustrated in FIG. 1. For ease of understanding the operation of the instant invention, a brief description of the switch unit operation is provided herewith.

Time division switching is based on the principle that periodic samples of an information signal are sufficient to completely define the signal and that such samples, derived from a multitude of signals, may be transmitted in a regular sequence over a time-shared common link. Thus a plurality of terminal stations such as telephones 1–*n*, FIG. 1, is connected to a common transmission link 100 through corresponding line gates, the latter being sampled on a selective basis for a predetermined time interval or time slot in a recurrent cycle of time slots. If a pair of gates is closed simultaneously for the prescribed time interval, a sample of the information available at each terminal will be transferred to the opposite terminal via the common transmission link 100 and the low pass filters included in each of the line circuits corresponding to the active gates. Thus a bilateral connection is established which, although physically connected for only a small fraction of the time, appears to be continuously connected because of the smoothing action of the line filters.

It is characteristic of the operation of contemporary PBX's that they are self-contained, i.e., the transmission circuits, switching networks, and all control circuits are located in one unit at the customer's premises. The instant system, as indicated in the aforementioned Gebhardt et al. application, extends the common control concept by having a centrally located control unit 20 which directs the call processing in all of the remote switch units including unit 10 via corresponding data links such as link 40. More specifically, the switch unit 10 informs the control unit 20 of all changes in the supervisory status of telephone lines, trunks and attendant console keys, e.g., whether they are idle (on-hook) or busy (off-hook). The control unit 20 then performs all of the decision-making tasks of call processing.

The operation of the switch unit 10 may be understood more fully upon consideration of a typical intra-PBX call. Assume telephone 1, FIG. 1, goes off-hook. This change of status is recognized by the scanner 110 which in turn formulates a message containing the corresponding line number and the new supervisory state. This information is transmitted to the control unit 20 via data transmitter 111 and the send leg of the data link 40.

The control unit 20, recognizing that there is no call which involves this particular line, determines that the off-hook indication is a request for service and proceeds to set up a digit-receiving connection. For this purpose a message is sent to the switch unit 10 via the receive leg of the data link 40 specifying that the telephone 1 be connected to a preselected digit trunk 50. This message is received by the data receiver 112 and transferred to the network control 114 via the data distributor 113. The network control 114, in turn, stores the calling line number, together with the designation of an available digit trunk 50. Thereafter, in a discrete time slot of the repetitive cycle, this information is translated in line translator 115 and appropriate control signals are applied simultaneously to the gates controlling the connection of the telephone and the digit trunk 50 to the common transmission link 100. Such a connection thus is effected during the predetermined time slot in the repetitive cycle. At the same time, the control unit 20 transmits dial tone via the digit trunk 50 to the telephone 1.

Telephone 1 now proceeds to dial or otherwise transmit the digits representing the called line, in this instance assumed to be the telephone *n*. Upon receipt of all of the called line digits, the control unit 20 transmits a message to the switch unit 10 which identifies the called telephone *n* and substitutes the number of the called telephone *n* for the number of the digit trunk 50 as contained in the network control 114, together with the number of the calling telephone 1. The effect of this alteration in the content of the network control memory is to connect the telephone *n* to the common transmission link 100 in the same slot as the telephone 1 is connected thereto, while inhibiting further connection of the digit trunk 50 to the common transmission link 100 in this time slot. Appropriate ringing tone connections are also established in this time slot, which connections are automatically removed upon answer at the called telephone *n*.

As shown in detail in FIG. 2, the network control 114 includes a memory 201 which stores the identifying number for both calling and called telephones involved in each call in progress. In essence, the memory 201 contains discrete storage areas with space sufficient to store the complete number designating the calling and called telephones. For ease of description, the memory is illustrated as containing a number of such discrete storage areas arranged in rows, each row capable of storing the identity of two telephone lines or trunks. Thus each row completely identifies an active call connection, either between two telephone lines or between a line and a trunk.

The number of rows in the memory 201 corresponds to the number of time slots in the cycle of time slots available for call connections. Information is stored in the memory 201 under control of the vertical write circuit 202 in conjunction with the horizontal access circuit 203, clock 204, and register 205. Thus information received in register 205 from the control unit 20 or from the memory 201 during a retrieval operation is written in the memory 201 upon address of the appropriate row by the horizontal access circuit 203.

During the retrieval operation, each row in the memory 201 is addressed in a regular sequence under control of the horizontal access circuit 203. Each row in the memory is read out in sequence during a corresponding discrete time interval, the sequence being established by binary counters 206 and 207, each of which counts a digit during each time slot.

In the system disclosed in the Gebhardt et al. application, the memory is addressed in a regular sequence such that all active call connections are established in the same regular sequence in each cycle of time slots. Thus, for example, the call connections involving the telephone lines having their numbers stored in rows 0 and 1 of the memory 201 will have their lines sampled in adjacent time slots in successive cycles. In this instance, any signal in the guard interval between the interconnections performed in time slots 0 and 1 may be picked up by the connection established in time slot 1 as adjacent channel crosstalk.

In accordance with my invention, this regular sequence of appearance of telephone line interconnections is altered so as to suppress such crosstalk. As indicated in FIG. 2, the rows of discrete storage areas in the memory 201 are divided into two distinct and unequal groups. In the example illustrated, 63 time slots are available in the cycle of operation for the switch unit 10, so that the memory is divided into groups 1 and 2 of 31 rows and 32 rows of storage areas, respectively. Binary counter 206 is arranged so as to count between 0 and 31, while binary counter 207 is arranged to count between 32 and 63. The clock 204 provides impulses to both counters 206 and 207, serving to advance them in alternate time slots.

The first operation upon entering a time slot is the read or retrieve operation. The clock 204 applies a read signal to the horizontal access circuit 203 at the beginning of each time slot. Since the memory 201 is word organized, a signal applied by the horizontal access circuit 203 to a particular one of the rows 0 through 63 results in the entire row being detected by the read out detector 208 and its subsequent storage in register 205. Such read out is destructive and an interval of time is allotted to the determination of whether the information contained in the register 205 is to be rewritten in the row of the memory 201 from which it was withdrawn, or whether new information provided by the control unit 20 is to modify or replace it. Such modification is accomplished in the register 205 prior to the writing operation.

The writing operation occurs in the latter portion of the time slot, as indicated by the write pulse from the clock 204 applied simultaneously to the horizontal access circuit 203 and the vertical write circuit 202. Thereafter, the register 205 is reset by a signal from the clock 204, which signal is also utilized to advance one of the binary counters 206 or 207, the clock 204 applying the advance signal alternately to these counters. Such an advance determines the row of the memory 201 to be addressed in the succeeding time slot by the horizontal access circuit 203.

With counter 206 covering the rows in the range 0 through 31 and counter 207 covering the rows in the range 32 through 63, and with these counters being advanced alternately, the sequence of memory address in successive time slots of a single cycle will be rows 0, 32, 1, 33, et cetera. However, since groups 1 and 2 comprise unequal numbers of rows, the sequence will be altered in the time slots of the succeeding cycle to the form 31, 32, 0, 33, et cetra. In effect, then, the time slots containing group 2 information precess in relation to the time slots containing group 1 information, and in successive cycles of operation no two time slots are adjacent one another. Consequently, the corresponding pairs of active lines are no longer interconnected in adjacent time slots in successive cycles, and adjacent channel crosstalk is effectively eliminated.

It is to be understood that the above-described arrangement is illustrative of the application of the principles of the invention. Numerous other arrangements may be devised by those skilled in the art without departing from the spirit and scope of the invention.

What is claimed is:

1. A time division switching system comprising a plurality of lines, a common link, means for selectively connecting each pair of said lines in communication to said link during a distinct time slot in a repetitive cycle of time slots, means for establishing a fixed position in each cycle for the time slots assigned to a first group of said pairs of lines in communication, means for establishing a fixed order of appearance in succesive cycles of the time slots assigned to a second group of said pairs of lines in communication, said first and second groups being unequal in number and means for interleaving the time slots of said first and second groups in each cycle.

2. A time division switching system comprising a plurality of lines, a common link, means for selectively connecting each pair of said lines in communication to said link during a distinct time slot in a repetitive cycle of time slots, means for assigning a fixed position in successive cycles to each of the time slots allotted to a first group of said pairs of lines in communication, means for assigning a different position in successive cycles to each of the time slots allotted to a second group of said pairs of lines in communication, said first and second groups being unequal in number, and means for alternating between said first and second groups in the selection of said time slots for an appearance in each cycle.

3. A time division switching system comprising a plurality of lines, a common link, means for selectively connecting each pair of said lines in communication to said link during a distinct time slot in a repetitive cycle of time slots, means for dividing the available time slots into unequal first and second groups, means for assigning each pair of said lines in communication to a distinct one of said time slots, and means for selecting the time slots of said first and second groups so that said second group precesses with respect to said first group in successive cycles.

4. A telephone system comprising a plurality of lines, a common link, gating means connecting each of said lines to said link, and means for enabling said gating means to interconncet active pairs of said lines via said common link in discrete time intervals of a repetitive cycle, said enabling means comprising a memory storing the designations of each pair of active lines in a discrete location, an access circuit for addressing each discrete location in said memory to retrieve the stored designations, means for applying the retrieved designations to the corresponding gating means, first means for activating said access circuit to address a first group of said discrete locations in sequence, second means for activating said access circuit to address a second group of said discrete locations in sequence, said first and second groups being unequal, and means for alternately operating said first and second activating means.

5. A telephone system in accordance with claim 4 wherein said first and second activating means each comprise a binary counter and wherein said operating means comprises means for advancing each of said counters by unity.

6. A communication system comprising a plurality of lines, a common link, a gate connecting each of said lines to said link and means for enabling said gates in pairs in discrete time intervals of a repetitive cycle, said enabling means comprising a memory having two unequal groups of discrete storage areas, each area containing the designations of an active pair of said lines, means for retrieving the designations stored in any one of said discrete storage areas comprising means for addressing each of said discrete storage areas, a pair of binary counters each covering the range of a corresponding one of said groups of discrete storage areas, means for applying the counter outputs alternately to said addressing means and means for advancing said counters by unity, and means for applying said retrieved designations to the corresponding pair of gates.

References Cited

UNITED STATES PATENTS

| | | | |
|---|---|---|---|
| 2,935,569 | 5/1960 | Saal et al. | 179—15 |
| 3,046,346 | 7/1962 | Kramer | 179—15 |
| 3,124,652 | 3/1964 | Biagi et al. | 179—1.5 |
| 3,202,764 | 8/1965 | Adams et al. | 179—1.5 |
| 3,233,042 | 2/1966 | Longton | 179—15 |

DAVID G. REDINBAUGH, *Primary Examiner.*

ROBERT L. GRIFFIN, *Examiner.*